(12) United States Patent
Seto et al.

(10) Patent No.: US 7,058,645 B2
(45) Date of Patent: Jun. 6, 2006

(54) MAPPING BETWEEN NATIVE DATA TYPE INSTANCES

(75) Inventors: Norman K. W. Seto, North York (CA); Piotr Przybylski, Brooklin (CA); Michael Beisiegel, Poughkeepsie, NY (US); Ilene Ruth Seelemann, Thornhill (CA); Harold Jeffrey Gartner, Thornhill (CA)

(73) Assignee: International Business Machines Corporation, Armonk, NY (US)

( * ) Notice: Subject to any disclaimer, the term of this patent is extended or adjusted under 35 U.S.C. 154(b) by 457 days.

(21) Appl. No.: 10/378,377

(22) Filed: Mar. 3, 2003

(65) Prior Publication Data

US 2004/0177160 A1  Sep. 9, 2004

(51) Int. Cl.
  *G06F 17/30* (2006.01)
(52) U.S. Cl. ..................... 707/101; 707/100
(58) Field of Classification Search ............ 707/10, 707/100, 101, 102, 103 R, 104.1; 705/37; 709/246; 717/114; 718/101, 106, 102
See application file for complete search history.

(56) References Cited

OTHER PUBLICATIONS

Unidex, Overview of XML Convert and Xflat, pp. 1-11, Last Modified Feb. 7, 2002.*

Microscoft, Global XML Web Services Architecture, pp. 1-9, Oct. 2001.*

Eric Armstrong, Working with XML, pp. 1-23, Last Modified Aug. 1999.*

Oracle, Blending Standards for High Performance Web Services, pp. 1-7, Copyright Apr. 2002.*

* cited by examiner

Primary Examiner—Apu M. Mofiz
(74) Attorney, Agent, or Firm—Herman Rodriguez; Leslie Van Leeuwen

(57) ABSTRACT

Mapping of a first native data type instance to a second native data type instance is performed in three stages: the first native data type instance is converted into a first programming language and platform independent representation conforming to a first schema capable of defining base and derived data types; the first programming language and platform independent representation is transformed into a second programming language and platform independent representation conforming to a second schema capable of defining base and derived data types; and the second programming language and platform independent representation is converted into the second native data type instance. The programming language and platform independent representations may be event-based extensible Markup Language (XML) representations implemented according to the Simple API for XML (SAX). The transformation may be governed by an extensible Stylesheet Language Transform (XSLT) stylesheet.

9 Claims, 9 Drawing Sheets

MAPPING BETWEEN NATIVE DATA TYPE INSTANCES

FIELD OF THE INVENTION

The present invention relates to computer software applications, and more particularly to mapping between instances of native data types in computer software applications.

BACKGROUND OF THE INVENTION

Computer software applications employ various data types to represent and store data. These data types may for example be base types (e.g. integer, character, or string), derived data types including user-defined types (e.g. records or arrays), or alternatively object-oriented types such as classes. The data types are typically implemented in a particular programming language for a particular platform. Such implementations are referred to as "native" date type instances, with the term "native" denoting programming language and platform dependency.

Occasionally it may be necessary or useful to map one native data type instance to a different native data type instance. Such mapping, for example, permits native data from legacy applications to be incorporated into new applications. In some cases, mapping may be desired between instances implemented in different programming languages (e.g. mapping of a Java™ integer to a COBOL string). In other cases, the desired mapping may be between instances that are both implemented in the same programming language but which differ in their structure (e.g. from one C structure representing an employee record into a different C structure representing a mailing address).

Most known approaches to mapping between native data type instances (or simply "mapping between native data types", as it is sometimes referred to) map directly from a source data type to a target data type. For example, code is written to map directly from, e.g., one C structure to another, or to map directly from a Java™ integer to a COBOL string. If it later becomes necessary to map either of the source or target native data types to a third native data type, the code may not be suited to such mapping due the fact that it is "hard-coded" to the source and target native data types. The direct mapping approach is thus highly customized to a particular problem and fails to anticipate the possible need for mapping into different native types in the future or to facilitate same.

What is needed is a solution which addresses, at least in part, these or other shortcomings.

SUMMARY OF THE INVENTION

Mapping of a first native data type instance to a second native data type instance is performed in three stages: the first native data type instance is converted into a first programming language and platform independent representation conforming to a first schema capable of defining base and derived data types; the first programming language and platform independent representation is transformed into a second programming language and platform independent representation conforming to a second schema capable of defining base and derived data types; and the second programming language and platform independent representation is converted into the second native data type instance. The programming language and platform independent representations may be event-based extensible Markup Language (XML) representations implemented according to the Simple API for XML (SAX). The transformation may be governed by an extensible Stylesheet Language Transform (XSLT) stylesheet. For each part of a native data type, an XMLReader object representing a stream of serialized XML document parsing events and a ContentHandler object for handling XML document parsing events may be provided. Extraneous start or end document events of aggregated XMLReader objects may be eliminated to create a single XML document parsing event stream for a native instance. The native instances may be represented as Web service messages which may have multiple parts, each part optionally representing a further Web service message.

Advantageously, once a mapping from a first native data type instance to a second native data type instance is established, mapping from either the first or second native data type instance to a third native data type instance may be simplified, involving only a transformation of the programming language and platform independent representation of the first or second native data type into a third programming language and platform independent representation and conversion into the third native data type instance.

A possible application of the invention is in the implementation of a transformation Web service which receives a message having a format compatible with a format of a message associated with a first Web service (e.g. an input or output message of the first Web service) and transforms the message into a format that is compatible with an input message format of a second Web service. The implementation may support transformations involving multiple input and/or output messages which have been aggregated into a single multi-part input and/or output message.

In accordance with one aspect of the present invention there is provided a method of mapping a first native data type instance to a second native data type instance, comprising: converting the first native data type instance into a first programming language and platform independent representation conforming to a first schema capable of defining base and derived data types; transforming the first programming language and platform independent representation into a second programming language and platform independent representation conforming to a second schema capable of defining base and derived data types; and further converting the second programming language and platform independent representation into the second native data type instance.

In accordance with another aspect of the present invention there may be provided a computer program product having media including computer programmed instructions for directing a computing device to implement the above method.

In accordance with yet another aspect of the present invention there may be provided a computing device comprising a processor and persistent storage memory in communication with the processor storing processor readable instructions for directing the device to undertake the above method.

In accordance with still another aspect of the present invention there is provided a method of generating a single set of document parsing events from a plurality of sets of document parsing events, comprising: receiving the plurality of sets of document parsing events, the plurality of sets including a plurality of start document events and a plurality of end document events; firing a leading start document event; firing the events of the received plurality of sets of document parsing events that are not start document events or end document events; and firing a trailing end document event.

In accordance with yet another aspect of the present invention there is provided a computer program product having media including computer programmed instructions for directing a computing device to implement a software component representative of a Web service message having one or more parts, the software component comprising: for each of the parts: a first software component adapted to convert the part into a programming language and platform independent representation of the part; and a second software component adapted to convert the programming language and platform independent representation of the part into the part.

Other aspects and features of the present invention will become apparent to those ordinarily skilled in the art upon review of the following description of specific embodiments of the invention in conjunction with the accompanying figures.

BRIEF DESCRIPTION OF THE DRAWINGS

In the figures which illustrate an example embodiment of this invention.

DETAILED DESCRIPTION

Figure 1:
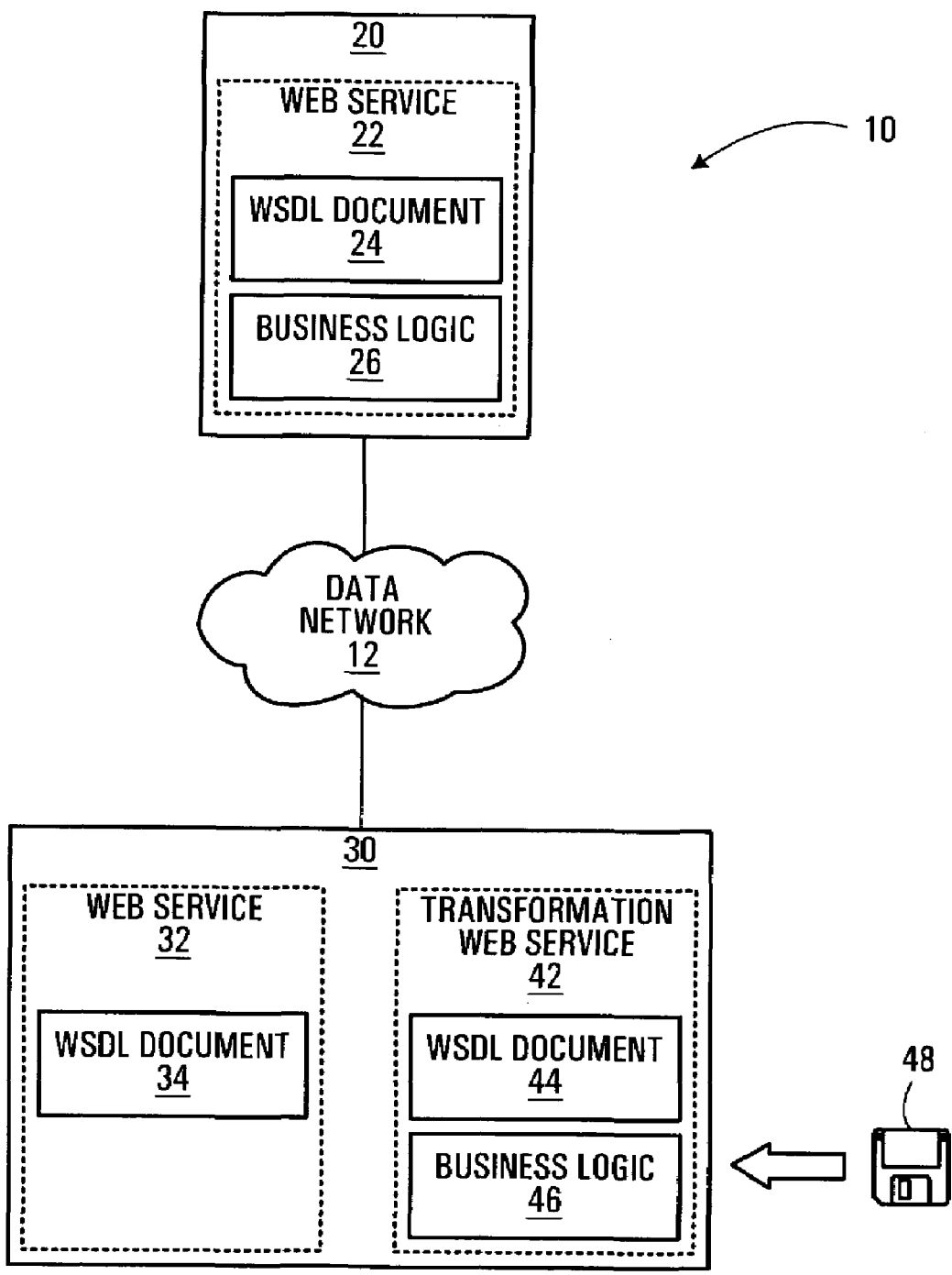
FIG. 1 is a schematic diagram of a computing system exemplary of the present invention.

FIG. 1 illustrates a computing system 10 exemplary of the present invention. Computing system 10 includes two computing devices 20 and 30 capable of intercommunication over a data network 12. The computing devices may be at distinct geographical locations. Each of computing devices 20 and 30 is a network-aware computing device and as such includes a processor, memory, a network interface such as an Ethernet interface, a display and a keyboard (all not shown).

Data network 12 is the Internet in the present embodiment. However, in alternative embodiments, data network 12 may be a private local area network or any other type of data network known to those skilled in the art.

Computing device 20 hosts a Web service 22. As known in the art, Web services are modular function descriptions which are discoverable on a network and facilitate remote invocation of the described functions from a web application regardless of the operating system and programming language in which the functions are implemented. Web service 22 is a customer order tracking service which receives a customer record comprising a customer's name and address and returns a string representative of tracking information for a mail order purchase made by the specified customer. The Web service 22 includes a Web services Description Language (WSDL) document 24 as well as business logic 26 which interact conventionally to provide the Web service 22 in a manner known to those skilled in the art. Web service 22 may be referred to as the "existing" Web service.

The WSDL document 24 describes the customer order tracking Web service 22 using WSDL. As known in the art, WSDL is an extensible Markup Language (XML)-based language used to describe the capabilities of a Web service (i.e. the operations it provides), where it resides, and how to invoke it. The WSDL document 24 includes various elements, e.g., to describe the operations (functions) provided by the Web service and to permit clients to locate and invoke any of the Web service's public operations, as will be familiar to those skilled in the art. Among these elements is a message element which describes the input message to the Web service 22 as having the following structure:

```
<message name="Customer">
    <part name="name" type="string"/>
    <part name="address" type="string"/>
</message>
```

The input message is expected to have a name field and an address field, each of which is defined to be a "part" (i.e. a WSDL part element) of the message in the WSDL document 24.

The above message object conforms to the WSDL schema. As known to those skilled in the art, the WSDL schema is an XML schema, and as such is capable of defining base data types (e.g. integer, character, float, string etc.) and derived data types (i.e. data types defined using base types, e.g., arrays or records). The WSDL schema is set forth in Appendix A.

Business logic 26 is the proprietary executable code which actually performs the customer order tracking function of the Web service 22. Business logic 26 is coded in a chosen programming language (e.g. Java™) for a particular operating system platform (e.g. Windows®) executed by the computing device 20.

The other computing device 30 shown in FIG. 1 hosts another Web service 32. Web service 32 is a customer order tracking service which receives a person record comprising a first name, last name, street name and street number, and returns a string representative of tracking information for a mail order purchase made by the customer represented by the person record. It will be appreciated that the Web service 32 provides similar functionality to the existing Web service 22, i.e. it receives an individual's name and address and returns mail order purchase tracking information. However, the format of the received customer information is different for the two Web services. The Web service 32 may be referred to as the "new" Web service, as it is understood to have been created after the Web service 22 was already in existence in the present example.

The new Web service 32 includes a WSDL document 34 which describes the new postal code lookup Web service 32 using WSDL. The WSDL document 34 includes a message element describing the input message to the Web service 32 as having four string parts representative of first name, last name, street name and street number, as follows:

```
<message name="Person">
    <part name="firstName" type="string"/>
    <part name="lastName" type="string"/>
    <part name="streetName" type="string"/>
    <part name="streetNum" type="string"/>
</message>
```

This message object also conforms to the WSDL schema of Appendix A.

Computing device 30 further hosts a transformation Web service 42. Web service 42 is a transformation service which receives a message representing a person object and transforms it into a message representing a customer object of substantially equivalent semantic meaning. Transformation Web service 42 serves as an intermediate service for transforming or mapping objects that are received by the new Web service 32 into objects having the input format required by the existing Web service 22. Its purpose is to permit the Web service 32 to invoke the existing Web service 22 in furtherance of its own provision of mail order purchase tracking information to its clients.

Transformation Web service 42 includes a WSDL document 44 and business logic 46, which may be loaded from a computer program product having a readable medium, such as a removable optical or magnetic disk 48.

WSDL document 44 defines various WSDL elements including a portType element defining a single operation for transforming messages containing person information into messages containing customer information. This operation is referred to as the "person-to-customer" mapping operation.

WSDL document 44 further defines a transformer binding to support the transformation operation. The purpose of a transformer binding is to provide a description, within the context of a WSDL Web service definition, of the transformation or mapping that is to be performed by the Web service, which in this case is between the input message format of Web service 32 and the input message format of Web service 22. Transformer bindings are an extension of WSDL and are described in more detail in the copending Canadian application no. 2,413,697, filed Dec. 6, 2002, entitled "Transformations As Web Services", which application is incorporated by reference hereinto.

The transformer binding associates the "person-to-customer" mapping operation with an extensible Stylesheet Language Transform (XSLT) stylesheet. As known in the art, an XSLT stylesheet provides instructions on transforming one XML object into another XML object. In the present case, the XSLT stylesheet provides instruction on transforming a person object into a customer object. This is achieved in the present example by concatenating the first and last name of the person object to create the name of the customer object and by concatenating the street number and street name of the person object to create the address of the customer object, as shown in the following XSLT stylesheet:

```
<xsl:transform>
    <xsl:template match="/">
        <Customer>
            <name>
                <xsl:value-of select="concat
                (/Person/firstName,
                " ", /Person/lastName)"/>
            </name>
            <address>
                <xsl:value-of select="concat
                (/Person/streetNum,
                " ", /Person/streetName)"/>
            </address>
        </Customer>
    </xsl:template>
</xsl:transform>
```

To illustrate the effect of executing such an XSLT stylesheet, consider an input person object having the following values:

```
<Person>
    <firstName>John</firstName>
    <lastName>Smith</lastName>
    <streetName>Avenue</streetName>
    <streetNum>111</streetNum>
</Person>
```

The resultant customer object following transformation will be as follows:

```
<Customer>
    <name>John Smith</name>
    <address>111 Avenue</address>
</Customer>
```

Referring again to FIG. 1, business logic 46 is the executable code which actually performs the transformation function of Web service 42. It is this business logic that is the focus of the present description.

Business logic 46 uses an Application Programming Interface (API) known as the Simple API for XML (SAX), which is known to those skilled in the art. Briefly, the SAX API is an event-based XML API which facilitates access to XML documents at run time. Event-based XML APIs utilize an XML parser (referred to as an "XMLReader" in SAX) to report events associated with a parsed XML document, such as the start of the XML document, the start of an XML element, the end of an XML element, etc., to an application through the use of callbacks (i.e. calls to application methods or functions). Applications employ event handlers to respond to the different XML element or attribute events, much in the same way that a graphical user interface event handler handles mouse or keyboard events. SAX is described in the following document: Chase, N., "Understanding SAX", IBM® DeveloperWorks®, http://www.ibm.com/developerWorks ("Tutorials and Training" page), Sep. 5, 2001, which document is incorporated by reference hereinto.

Figure 2:
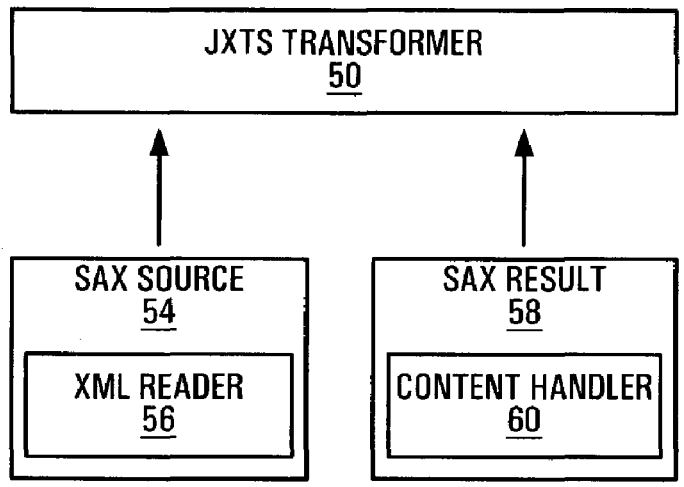
FIG. 2 is a schematic diagram illustrating known javax.xml.transform and javax.xml.transform.sax classes from the Java™ 2 Platform SE used to transform XML objects.
Figure 3:
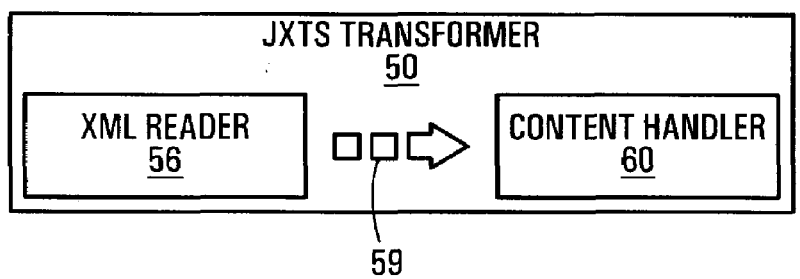
FIG. 3 is a schematic diagram illustrating the relationship between two of the known classes of FIG. 2 during XML object transformations.

Business logic 46 further employs known Java™ technology from SUN™ Microsystems for transforming XML objects of one type into XML objects of another type. In particular, business logic 46 employs javax.xml.transform and javax.xml.transform.sax classes from the Java™ 2 Platform SE (referred to herein as the "JXTS classes"). This technology is illustrated in FIGS. 2 and 3. It should be appreciated that FIGS. 2 and 3 do not illustrate actual components of the computing system 10 of FIG. 1, but rather illustrate JXTS classes in the abstract for purposes of briefly describing the technology, which is known to those skilled in the art. The use of this technology in the present embodiment will be described subsequently.

As can be seen in FIG. 2, the known architecture of the javax.xml.transform and javax.xml.transform.sax classes includes three primary components: a JXTS transformer 50, a SAXSource 54, and a SAXResult 58. SAXSource 54 and SAXResult 58 are arguments passed into the transform( ) method of the JXTS transformer 50, as denoted by the vertical arrows of FIG. 2.

JXTS transformer 50 is an object which orchestrates the transformations of XML objects of one format into XML objects of another format. JXTS transformer 50 is a product of a SAX Transformer Factory object, which is a known class of objects that receives an XSLT stylesheet describing an XML object transformation and generates therefrom a JXTS transformer, such as JXTS transformer 50, for performing the described transformation using SAX. JXTS transformer 50 is the "engine" which performs the XML object transformation in accordance with the original XSLT stylesheet in a manner known to those skilled in the art.

SAXSource 54 is an object representing the object to be transformed. Aggregated within SAXSource 54 is an XML-Reader 56 (aggregation being indicated by the nested relationship of these objects in FIG. 2). XMLReader 56 essentially converts the source object into a linear series of XML document events upon the invocation of its parse( ) method. Consider the following sample XML document representing an object to be transformed:

```
<?xml version="1.0"?>
<date>
    <month>January</month>
    <day>27</day>
</date>
```

Upon invocation of the parse( ) method of the XML-Reader 56, this document would be converted into the following linear series of document parsing events (the conversion alternatively being referred to as "firing events"):
    start document
    start element: date
    characters: (white space)
    start element: month
    characters: January
    end element: month
    characters: (white space)
    start element: day
    characters: 27
    end element: day
    characters: (white space)
    end element: date
    end document As can be seen above, the XMLReader 56 generates parsing events corresponding with the contents of the XML document, with an initial start document event and a trailing end document event.

SAXResult 58 is an object which represents the "transformed" XML object. Aggregated within SAXResult 58 is a ContentHandler 60. ContentHandler 60 is an event handler which handles XML document parsing events associated with the transformed XML object through the use of callbacks, much in the same way that a graphical user interface event handler handles mouse or keyboard events. Upon the detection of a particular XML document parsing event, a callback from the ContentHandler 60 will trigger the execution of a particular segment of code (typically, application code) that is intended to be executed when that XML document parsing event is detected (e.g. upon the detection of a "month" element, code which determines the season of the year may be executed).

It should be emphasized that ContentHandler 60 handles events associated with the transformed XML object, not the original XML object. Thus, if the JXTS transformer 50 has been designed to convert the above date element into a "dayOfYear" element having a value from 1 to 366, the ContentHandler 60 would be capable of handling "dayOfYear" events but would not be capable of handling (i.e. would ignore or "drop") the original date, day and month events. The conversion of the source object's XML parsing events to the target object's XML parsing events is performed by the JXTS transformer 50 in a manner known to those skilled in the art.

FIG. 3 illustrates the effective relationship between the XMLReader 56 and ContentHandler 60 of FIG. 2 during transformation. Upon invocation of the parse( ) method of the XMLReader 56, the above listed events corresponding to original XML object elements or attributes will be fired. Each event firing is effected by way of a call to a method of a ContentHandler (not shown) that is supplied by the JXTS transformer 50, e.g.:

```
public void parse(InputSource input) throws IOException,
    SAXException {
        contentHandler.startDocument( );
        contentHandler.startElement("","date","", null);
        contentHandler.characters("(white space)");
        contentHandler.startElement("","day","", null);
        :
        : (calls omitted)
        :
        contentHandler.endElement("","date","");
        contentHandler.endDocument( );
}
```

The ContentHandler 60 does not however receive the events fired by the XMLReader 56. Rather, in a technique known to those skilled in the art, the JXTS transformer 50 transforms these events, in accordance with the XSLT stylesheet from which the JXTS transformer 50 was created, into corresponding events of the transformed XML object. That is, the JXTS transformer 50 uses information from the events fired by the XMLReader 56 to fire transformed XML object events, e.g.:

```
:
contentHandler.startElement("","dayOfYear","", null);
contentHandler.characters("[number     from     1–366]");
contentHandler.endElement("","dayOfYear","");
:
(etc.)
```

The transformation performed by JXTS transformer 50 is represented by the dashed arrow 59 in FIG. 3.

Figure 4:
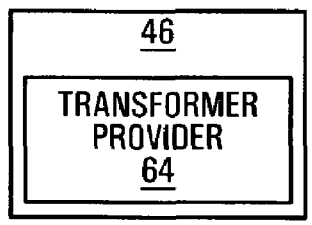
FIG. 4 is a schematic diagram illustrating the business logic of FIG. 1 in greater detail.

FIG. 4 illustrates the business logic 46 of the exemplary embodiment of FIG. 1 in greater detail. Business logic 46 comprises a transformer provider 64 which performs the transformation function of Web service 42. Transformer provider 64 implements a standard API of the Web Services Invocation Framework (WSIF) developed by IBM®. As known in the art, WSIF is a toolkit which supports concrete implementation of Web services described in a WSDL document. WSIF provides a concrete class for the major elements of a WSDL description (message elements, port-Type elements, operation elements, etc.) which support dynamic invocation of proprietary function implementations that are abstractly described by the WSDL document. The standard API provided by WSIF supports invocation of Web services described in WSDL, regardless of how or where the services are provided. A description of WSIF is provided in the following references: Mukhi, N. K., "Web service invocation sans SOAP—How WSIF scores over the current client programming models for Web services", IBM® developerWorks®, http://www-106.ibm.com/developerworks/webservices/library/ws-wsif.html, September 2001; Mukhi, N. K. et al., "Web service invocation sans SOAP, Part 2: The architecture of Web Service Invocation Framework", IBM® developerWorks®, http://www-106.ibm.com/developerworks/webservices/library/ws-wsif2/, September 2001; and Fremantl, P., "Applying the Web services invocation framework", IBM® developerWorks®, http://www-106.ibm.com/developerworks/webservices/library/ws-wsif2/, June 2002. These references are attached hereto as Appendices B, C and D.

Figure 5:
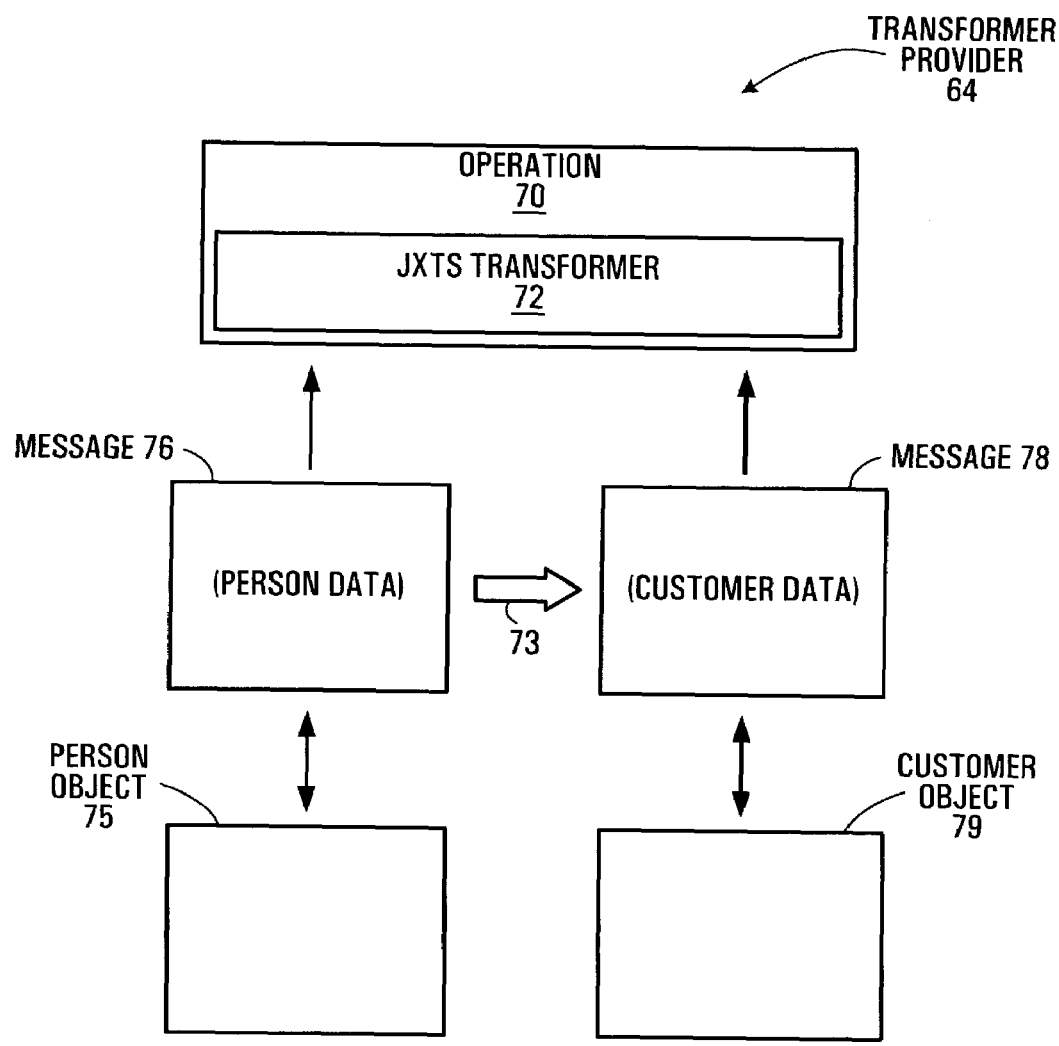
FIG. 5 is a schematic diagram illustrating the transformer provider of FIG. 4 in greater detail along with exemplary message objects and native data type instances.

FIG. 5 illustrates various components of the transformer provider 64. The components include an operation object 70, a message object 76, a message object 78, a person object 75, and a customer object 79.

Operation object 70 is an instance of a concrete WSIF class for the "person-to-customer" transformation operation described in WSDL document 44. Operation object 70 contains a JXTS transformer 72 which is the "engine" for performing the transformation of a message object containing person information into a message object containing customer information (this transformation being represented in FIG. 5 by the arrow 73). JXTS transformer 72 is the same type of JXTS transformer as shown in FIG. 2 (JXTS transformer 50). In this case, the JXTS transformer 72 is created from the XSLT stylesheet which was provided in the transformer binding of the WSDL document 44 (FIG. 1) of the transformation Web service 42.

Message object 76 is an instance of a concrete WSIF class for the person message described in WSDL document 34 (FIG. 1). Message object 76 may for example be a Java™ language implementation. The message 76 is capable of containing person data, including first name, last name, street name and street number information, with each of these four types of information being represented as a single message part.

Message object 78 is an instance of a concrete WSIF class for the customer message described in WSDL document 24 (FIG. 1). Message object 78 may also be a Java™ language implementation. The message 78 is capable of containing customer data including name and address information, with each of these two types of information being represented as a message part.

Person object 75 is a native data type instance containing person data including first name, last name, street name and street number information. It is this person object 75 which is represented by the message object 76. Person object 75 may for example be a Java™ language implementation, and may be represented by the interface:

```
public interface Person {
    public String getFirstName( );
    public String getLastName( );
    public String getStreetName( );
    public String getStreetNum( );
    public void setFirstName(String value);
    public void setLastName(String value);
    public void setStreetName(String value);
    public void setStreetNum(String value);
}
```

Customer object 79 is a different native data type instance containing customer data including name and address information. It is this customer object 79 which is represented by the message object 78. Customer object 79 may also be a Java™ language implementation, and may be represented by the interface:

```
public interface Customer {
    public String getName( );
    public String getAddress( );
    public void setName(String value);
    public void setAddress(String value);
}
```

Figure 6:
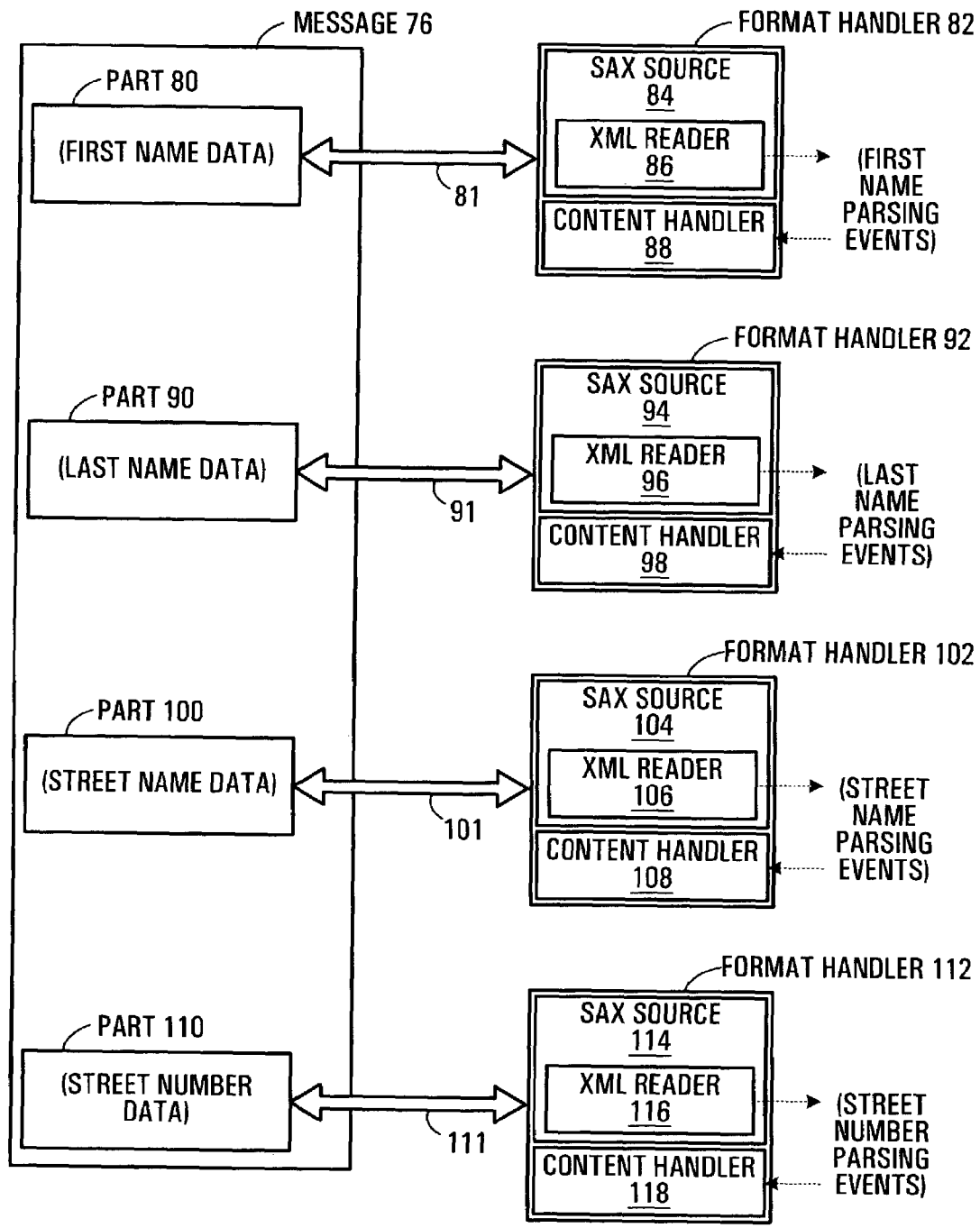
FIG. 6 is a schematic diagram illustrating one of the message objects of FIG. 5 in greater detail along with associated format handler objects.

FIG. 6 illustrates the message object 76 of FIG. 5 in greater detail along with associated FormatHandler objects 82, 92, 102, and 112.

Message object 76 includes four subordinate part objects 80, 90, 100 and 110. Each of these part objects implements one of the message parts described in WSDL document 34 (FIG. 1). In particular, part 80 implements the firstName message part and contains first name data; part 90 implements the lastName message part and contains last name data; part 100 implements the streetName message part and contains street name data; and part 110 implements the streetNum message part and contains street number data. The contained part objects 80, 90, 100, and 110 are implemented in the Java™ programming language in the present embodiment.

Each of the parts 80, 90, 100, and 110 has an associated FormatHandler 82, 92, 102, and 112 respectively. A FormatHandler is an object capable of transforming an object of one format into an object of another format. FormatHandlers are described in more detail in the aforementioned Canadian application no. 2,413,697, entitled "Transformations as Web Services" filed on Dec. 6, 2002, which application is incorporated by reference hereinto.

In the present embodiment, the FormatHandlers 82, 92, 102, and 112 are used during the conversion of the native person object 75 (FIG. 5), as represented by message object 76, into or from a corresponding programming language and platform independent representation, which in this case is an event-based XML representation implemented according to the SAX API, as will be described.

The FormatHandler 82, which is associated with part object 80, is capable of converting the data of part object 80 into and from corresponding XML document parsing events, as represented in FIG. 6 by way of double-headed arrow 81. For example, if the part object 80 stores first name data with the value "John" (e.g. as a Java™ string), the FormatHandler 82 is capable of generating corresponding events as follows:

```
start document
start element: firstName
characters: John
end element: firstName
end document
```

These XML document parsing events are illustrated as a dotted arrow emanating from XMLReader 86. To achieve this goal, the FormatHandler 82 aggregates a SAXSource object 84 containing an XMLReader 86. The XMLReader 86 has a parse( ) method which, when invoked, triggers the firing of events illustrated above.

To convert XML document parsing events comprising a programming language and platform independent representation of first name person data into the corresponding native part object 80, the ContentHandler 88 receives the events shown above and employs FormatHandler business logic to convert them to the first name part object 80. These received XML document parsing events are illustrated as a dotted arrow into the ContentHandler 88.

Each of the remaining part objects 90, 100 and 110 similarly has an associated FormatHandler 92, 102 and 112 which operates analogously to the FormatHandler 82 to convert its native last name, street name, and street number data into and from a corresponding programming language and platform independent representation, as represented by double-headed arrows 91, 101 and 111, respectively.

As will become apparent, during the mapping of a person object 75 to a corresponding customer object 79 (FIG. 5), the SAXSource objects 84, 94, 104 and 114 and associated XMLReader objects 86, 96, 106, and 116 are utilized. The ContentHandler objects 88, 98, 108 and 118, however, are not utilized; these are present for versatility, for possible use in the event that it is later desired to map a native data type instance to the person object 75.

Figure 7:
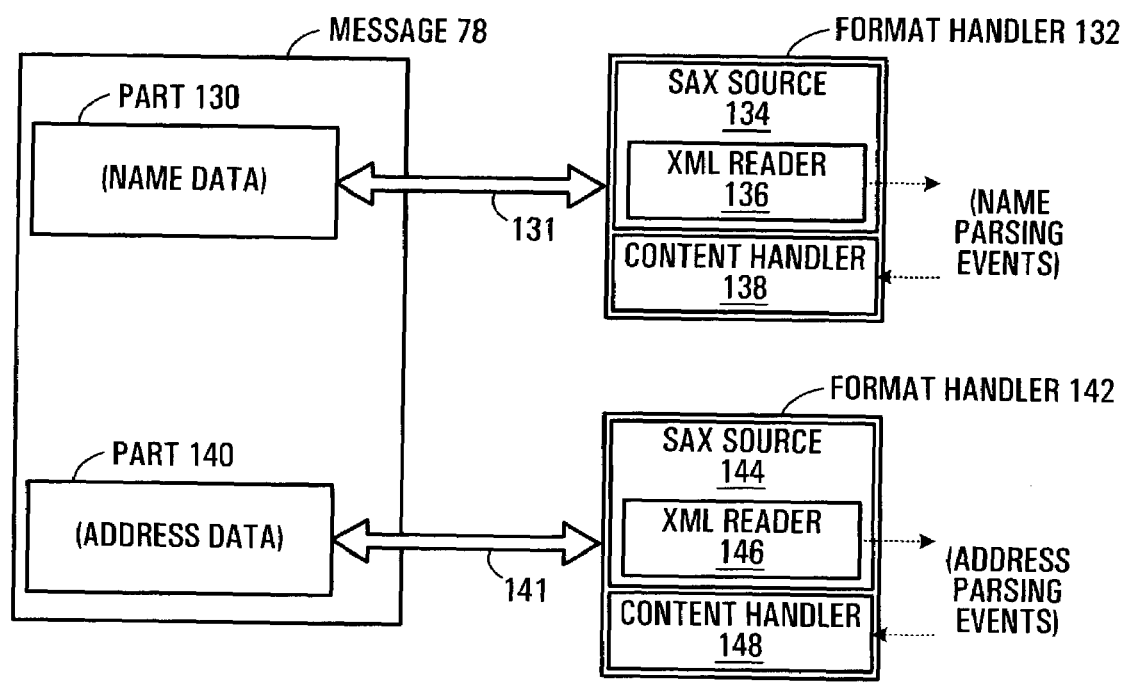
FIG. 7 is a schematic diagram illustrating the other message object of FIG. 5 in greater detail along with associated format handler objects.

FIG. 7 illustrates the message object 78 of FIG. 5 in greater detail along with associated FormatHandler objects 132 and 142. The structure of message object 78 and its relationship with the associated FormatHandlers 132 and 142 is analogous to the structure and relationships of the message object, part objects and FormatHandler objects shown in FIG. 6. In particular, message object 78 contains customer information in the form of two native part objects 130 and 140 storing customer name and address data respectively. FormatHandlers 132 and 142 are capable of converting this name and address data into and from corresponding XML document parsing events, which are represented by dotted lines. The bi-directional conversions are represented by double-headed arrows 131 and 141 respectively.

As will become apparent, during the mapping of a person object 75 to a corresponding customer object 79, the ContentHandler objects 138 and 148 are utilized. The SAXSource objects 134 and 144 and associated XMLReader objects 136 and 146, however, are not utilized; these are present for versatility, for possible use in the event that it later desired to map the customer object 79 to another native data type instance.

Figure 8:
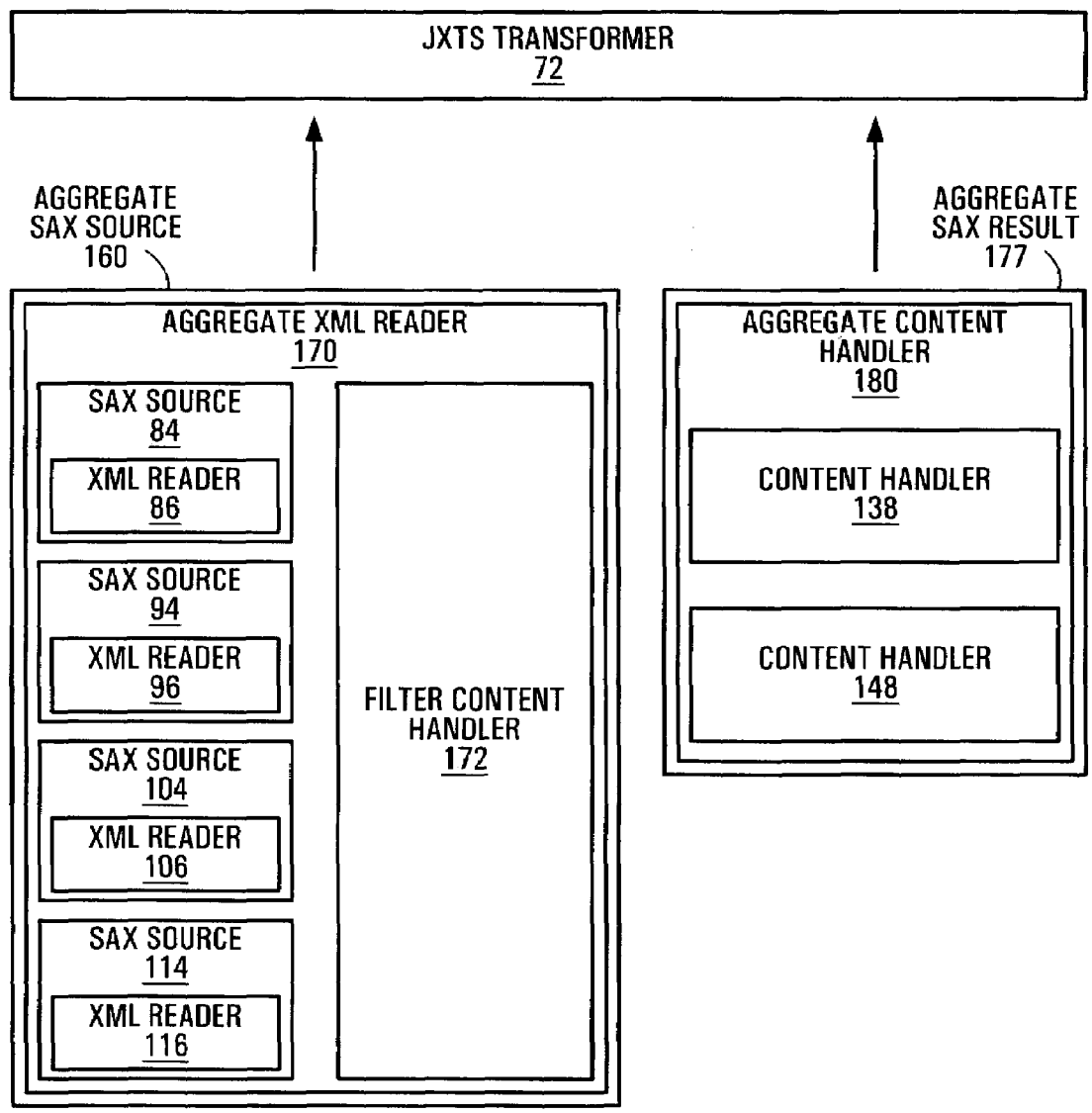
FIG. 8 is a schematic diagram illustrating various software components involved in mapping from the message object of FIG. 6 to the message object of FIG. 7.

FIG. 8 illustrates various software components involved in transforming the message object of FIG. 6 into the message object of FIG. 7. These components are: a JXTS transformer 72; an Aggregate SAXSource 160; an Aggregate XMLReader 170; an Aggregate SAXResult 177; and an Aggregate ContentHandler 180.

The JXTS transformer 72 is the same JXTS transformer as was shown in FIG. 5. It is the "engine" which drives the transformation of a message object 76 containing person information into a message object 78 containing customer information.

Aggregate SAXSource 160 is a SAXSource object comprising an aggregation of all of the SAXSource objects 84, 94, 104 and 114 of the message object 76 shown in FIG. 6. The Aggregate SAXSource 160 is created by the message object 76, which instantiates the Aggregate SAXSource 160 as a list to which the SAXSource objects 84, 94, 104 and 114 are added. The SAXSource objects 84, 94, 104 and 114 are returned by a getSource( ) method of FormatHandlers 82, 92, 102 and 112 respectively. The purpose of the getSource( ) method is to return code capable of firing events which represent the object in question (here, different parts of the message object 76).

Aggregate XMLReader 170 has a parse( ) method which sequentially calls the parse( ) method of all its aggregated XMLReaders 86, 96, 106 and 116. The Aggregate XMLReader also includes a Filter ContentHandler 172, which is described below.

Aggregate SAXResult 177 is a SAXResult object which contains Aggregate ContentHandler 180.

Aggregate ContentHandler 180 is a ContentHandler object comprising an aggregation of the ContentHandler objects 138 and 148. The ContentHandler objects 138 and 148 are returned by a getContentHandler( ) method of FormatHandlers 132 and 142 respectively. The purpose of the getContentHandler( ) method is to return code capable of handling events which represent the object in question (here, different parts of the message object 78). Aggregate ContentHandler 180 delegates any received events to each of the aggregated ContentHandlers 138 and 148. The subordinate ContentHandlers 138 and 148 respond to different sets of recognized events and drop unrecognized events.

The Aggregate SAXSource 160 and Aggregate SAXResult 177 are arguments passed into the JXTS transformer 72, as denoted by the vertical arrows of FIG. 8.

Figure 9:
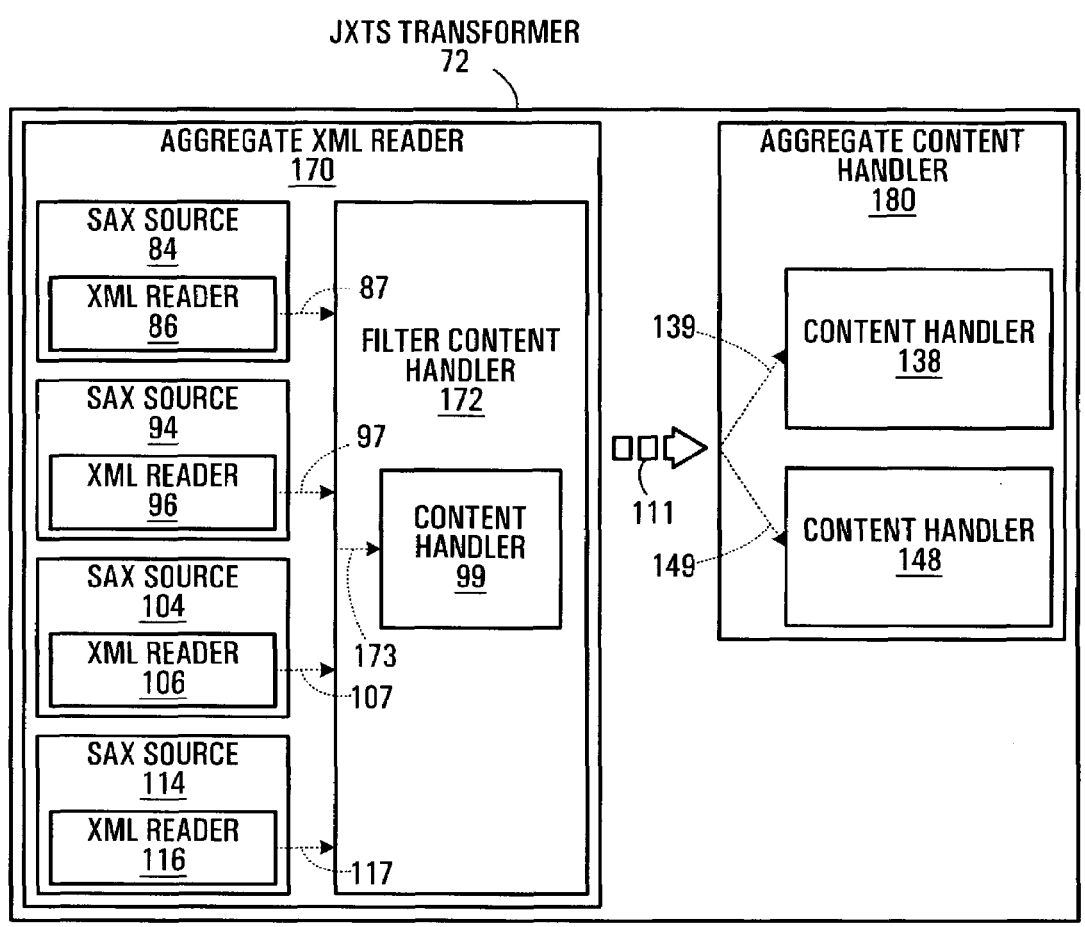
FIG. 9 is a schematic diagram showing operation for mapping from the message object of FIG. 6 to the message object of FIG. 7.

FIG. 9 illustrates the effective relationship between the Aggregate XMLReader 170 and Aggregate ContentHandler 180 of FIG. 8 during transformation.

As may be seen in FIG. 9, the Filter ContentHandler 172 of Aggregate XMLReader 170 includes a ContentHandler 99. This ContentHandler 99 is supplied by the JXTS transformer 72. The purpose of the Filter ContentHandler 172 is to address the problem of redundant or extraneous start document and end document XML document parsing events generated by the XMLReaders 86, 96, 106 and 116. The Filter ContentHandler 172 effectively combines the four XML document parsing event streams generated by the XMLReader objects 86, 96, 106 and 116 (illustrated as dotted arrows 87, 97, 107 and 117 respectively) into a single XML document parsing event stream (dotted arrow 173) and provides this single event stream to the ContentHandler 99, as will be described.

Operation for mapping from the person object 75 to the customer object 79 (FIG. 5) occurs in three stages as shown in FIG. 9.

In a first stage of operation ("stage 1"), the person object 75 (a native data type instance) is converted into XML document parsing events (a programming language and platform independent representation). The first stage occurs two phases in the present embodiment.

In the first phase of stage 1, the person object 75 is represented as a WSDL-compliant WSIF message 76. In the present example, code is executed to convert the person object 75, which may have been instantiated upon invocation of the transformation Web service 42 (e.g. through conversion of received message following the binding specified in the WSDL document 44, e.g., the Simple Object Access Protocol (SOAP), into a Java™ bean), into the WSIF message object 76, e.g.:

```
Message personMsg = new WSIFDefaultMessage( );
personMsg.setObjectPart("firstName",
   person.getFirstName( ));
personMsg.setObjectPart("lastName", person.getLastName( ));
personMsg.setObjectPart("streetName",
      person.getStreetName( ));
personMsg.setObjectPart("streetNum",
   person.getStreetNum( ));
```

As will be appreciated, the "setObjectPart" method of the message object 76 sets the specified part to a specified value.

In the second phase of stage 1, the FormatHandlers 82, 92, 102 and 112 associated with the parts 80, 90, 100 and 110 of the message 76 (FIG. 6) (which parts were populated in the first phase of stage 1) are each invoked to convert the parts 80, 90, 100 and 110 into the corresponding SAXSource objects 84, 94, 104 and 114, respectively. This is shown as already having occurred in FIG. 9.

The parse( ) method of the Aggregate XMLReader 170 invokes each of the parse( ) methods of the subordinate XMLReaders 86, 96, 106 and 116 in sequence. Invocation of the subordinate XMLReaders' parse( ) methods causes the firing of a set of XML document parsing events corresponding to each message part. These events are illustrated as dotted arrows 87, 97, 107, and 117 in FIG. 9.

As described above with reference to FIG. 3, the firing of XML document parsing events is actually achieved by way of a series of calls to ContentHandler methods. In the present case, the ContentHandler that is called is the Filter ContentHandler 172. For example, in the case of the first part 80 of message 76 (FIG. 6), the events 87 (FIG. 9) may be fired as follows:

```
filterContentHandler.startDocument( );
filterContentHandler.startElement("","firstName","", null);
filterContentHandler.characters("John");
filterContentHandler.endElement("","firstName","");
filterContentHandler.endDocument( );
```

Each of the other part objects 90, 100 and 110 (FIG. 6) similarly fires a set of XML document parsing events 97, 107 and 117 (FIG. 9). Each set of events 87, 97, 107 and 117 begins with a start document event and ends with an end document event.

In response to these method invocations, the Filter ContentHandler 172 combines the four XML document parsing event streams 87, 97, 107 and 117 respectively into a single XML document parsing event stream 173. This is achieved by way of program logic within the Filter ContentHandler 172 which delegates only one leading start document event and one trailing end document event to the ContentHandler 99 supplied by the transformer 72, which eliminates (i.e. avoids delegation of) any extraneous start document events and extraneous stop document events fired by the XMLReaders 86, 96, 106 and 116. The purpose of this processing is to avoid an interpretation of XML document completion by the ContentHandler 99, as might otherwise occur in view of the standard processing of end document events by ContentHandler objects (i.e. to consider the document as being complete). Non start document events and non end document events are delegated unchanged to the ContentHandler 99 by the Filter ContentHandler 172.

At this point, the message 76 has been converted to a programming language and platform independent representation, which here is set of XML document parsing events. The first stage of operation is thus concluded.

In the second stage of operation, in a manner analogous to that described with reference to FIG. 3, the JXTS transformer 72 transforms the events 173 into corresponding events of the message object 78, in accordance with the XSLT stylesheet from which the JXTS transformer 72 was created (which XSLT stylesheet originated from the transformer binding of WSDL document 44 of FIG. 1).

That is, the JXTS transformer 72 uses information from the events fired by the XMLReaders 86, 96, 106 and 116 to fire transformed XML object events, e.g.,

```
:
   aggregateContentHandler.startElement("","name","", null);
   aggregateContentHandler.characters("John       Smith");
   aggregateContentHandler.endElement("","name","");
   aggregateContentHandler.startElement("","address","",
null);
   aggregateContentHandler.characters("111       Avenue");
   aggregateContentHandler.endElement("","address","");
:
(etc.)
```

The transformation performed by JXTS transformer 72 is represented by the dashed arrow 111 in FIG. 9.

In turn, the Aggregate ContentHandler object 180 delegates unchanged each XML document parsing event received from the JXTS transformer 72 to subordinate ContentHandlers 138 and 148 (illustrated by way of the dotted arrows 139 and 149 in FIG. 9). That is, each of the subordinate ContentHandlers 138 and 148 receives every event that is received by the Aggregate ContentHandler 180, processing the events that are relevant to it and dropping unrecognized events. In the present embodiment, the ContentHandler 138 processes name events and drops address events while the ContentHandler 148 conversely drops name events and processes address events. This concludes the second stage of operation.

In the third and final stage of operation ("stage 3"), XML document parsing events are converted into the customer object 79 (FIG. 5). Stage 3 occurs in two phases in the present embodiment which are essentially the converse of the first and second phases of the stage 1.

In the first phase of stage 3, after the ContentHandlers 138 and 148 have received the delegated event streams 139 and 149 respectively, operation of the FormatHandlers 132 and 142 associated with these ContentHandlers is triggered to convert the XML parsing events into native parts 130 and 140, respectively, of WSIF message 78 (FIG. 7).

In the second phase of stage 3, the customer object 79 is populated from the WSIF message 78, e.g.:

```
customer.setName(CustomerMsg.getObjectPart("name").
   toString( ));
customer.setAddress(CustomerMsg.getObjectPart("address").
   toString( ));
```

The "getObjectPart" method of the message object 78 retrieves the value of the specified part. The third stage of operation is thus concluded.

With the person object 75 now having been mapped to customer object 79, operation is complete.

Advantageously, the present embodiment may be used to support transformations involving multiple input and/or output messages which have been aggregated into a single multi-part input and/or output Web service message. This is because the Web service message is implemented as an object having subordinate parts even when these subordinate parts themselves represent messages.

Figure 10:
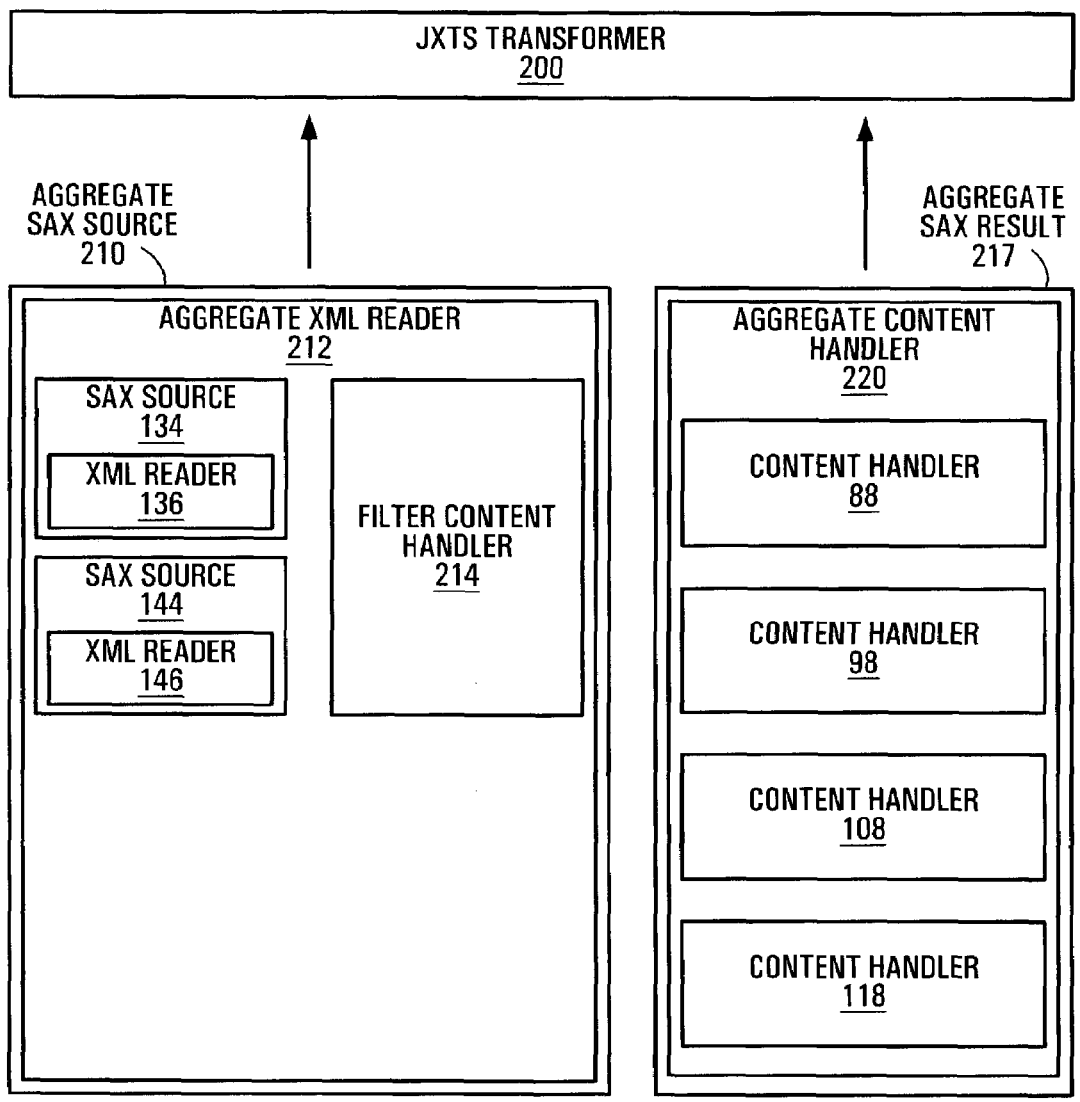
FIG. 10 is a schematic diagram illustrating various software components involved in mapping from the message object of FIG. 7 to the message object of FIG. 6.

The versatility of the present embodiment is illustrated in FIG. 10 which illustrates various software components involved in a reverse mapping from the customer object 79 to the person object (FIG. 5). Five components are illustrated: a JXTS transformer 200; an Aggregate SAXSource 210; an Aggregate XMLReader 212; an Aggregate SAXResult 217; and an Aggregate ContentHandler 220.

The JXTS transformer 200 is analogous to the JXTS transformer of FIG. 5, except that it drives a transformation of the message object 78 containing customer information into a message object 76 containing person information (rather than a transformation in the reverse direction). JXTS transformer 200 is be created from an XSLT stylesheet which describes the "customer-to-person" transformation.

Aggregate SAXSource 210 is a SAXSource object comprising an aggregation of the existing SAXSource objects 134 and 144 of the message object 78 shown in FIG. 7. The Aggregate SAXSource 210 is created by the message object 78, which instantiates the Aggregate SAXSource 210 as a list to which the SAXSource objects 134 and 144 are added.

Aggregate XMLReader 212 has a parse( ) method which sequentially calls the parse( ) method of all its aggregated XMLReaders 136 and 146. The Aggregate XMLReader also includes a Filter ContentHandler 214 which addresses the problem of redundant or extraneous start document and end document XML document parsing events generated by the XMLReaders 136 and 146.

Aggregate SAXResult 217 is a SAXResult object which contains Aggregate ContentHandler 220.

Aggregate ContentHandler 220 is a ContentHandler object comprising an aggregation of the ContentHandler objects 88, 98, 108 and 118 of the message object 76 of FIG. 6. The Aggregate ContentHandler 220 is created by the message object 76, which instantiates the Aggregate ContentHandler 220 as a list to which the ContentHandlers 88, 98, 108 and 118 are added. Aggregate ContentHandler 220 delegates any received events to each of the aggregated ContentHandlers 88, 98, 108 and 118.

It will be appreciated that, in this reverse mapping of a customer object 79 to a corresponding person object 75, the existing ContentHandler objects 88, 98, 108 and 118 and existing SAXSource objects 134 and 144 (and associated XMLReader objects 136 and 146) are now utilized. However, the SAXSource objects 84, 94, 104 and 114 (FIG. 6) and ContentHandler objects 138 and 148 (FIG. 7) are no longer utilized.

Implementation of the reverse mapping thus largely consists of creating a new JXTS transformer 200.

Advantageously, if it becomes necessary to map either person object 75 or customer object 79 (i.e. either of the first or second native data instances) to a third native data instance, mapping may be effected simply through provision of a suitable JXTS transformer generated from a developed XSLT stylesheet which describes the desired mapping and of (a) suitable FormatHandler object(s) corresponding to the part(s) of a third WSIF message object analogous to message object 76 or 78.

Figure 11:
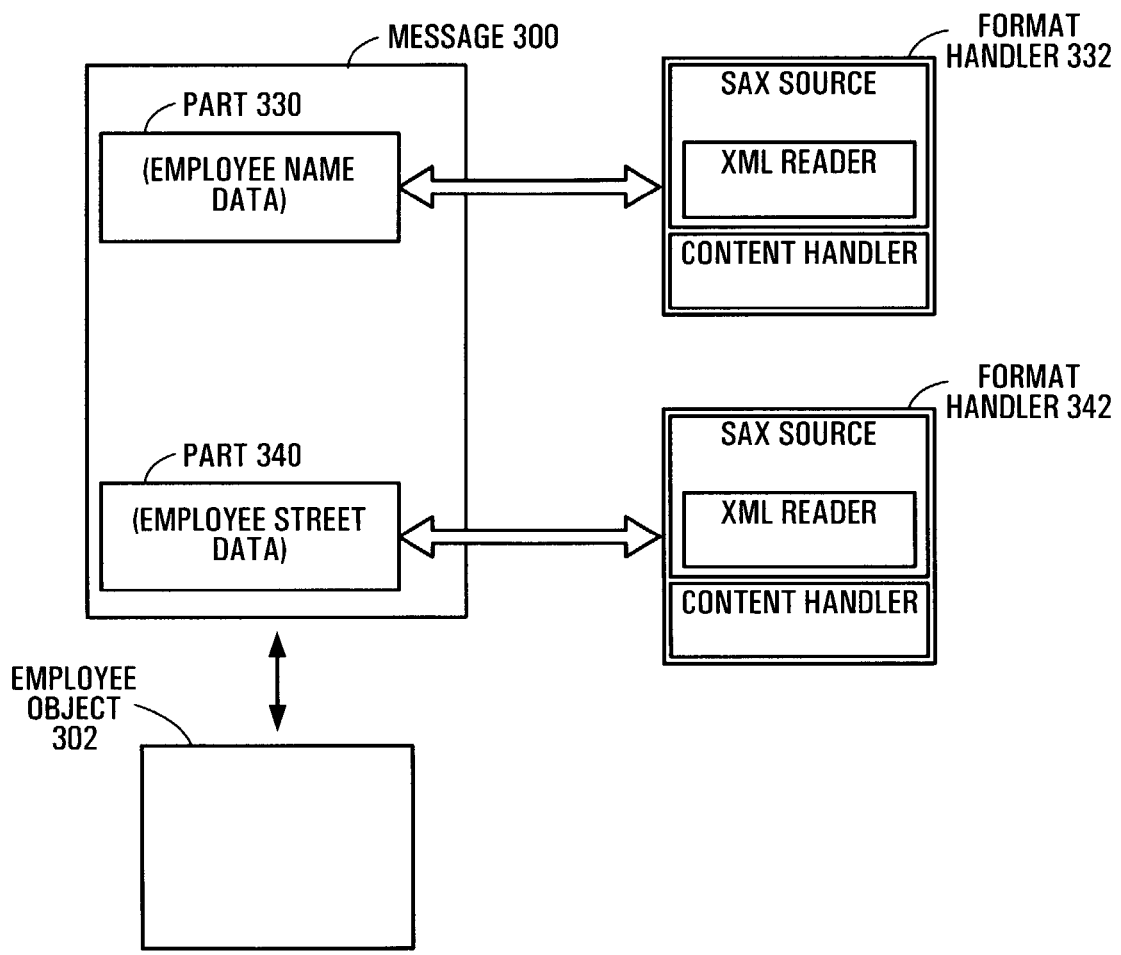
FIG. 11 is a schematic diagram illustrating a third exemplary message object and associated format handler objects which may be used in an alternative embodiment of the present invention.

For example, if it is desired to map the person object 75 to a Java™ employee object 302 (FIG. 11) (as may be represented by message object 300, which has parts 330 and 340 containing employee name and street information, respectively, analogously to the representation of person and customer objects 75 and 79 by messages 76 and 78 (FIG. 5)), conversion may be effected through provision of a suitable JXTS transformer (not shown) generated from a developed XSLT stylesheet which describes the transformation of a person object to an employee object, and through provision of FormatHandler objects 332 and 342 corresponding to parts 330 and 340 respectively of message object 300. The creation of FormatHandler objects 332 and 342 would entail the implementation of getSource( ) and getContentHandler( ) methods similar to those previously described in respect of the above embodiment which retrieve SAXSource and ContentHandler objects appropriate for the parts of the employee message 300. Advantageously, message object 76 and its associated FormatHandlers 82, 92, 102 and 112 (FIG. 6) may be reused.

In an alternative implementation of the above-described embodiment wherein a person object 75 (FIG. 5) is mapped to the customer object 79 (FIG. 5), it is assumed that the message element of WSDL document 24 (FIG. 1) has the following alternative structure:

```
<message name="CustomerMessage">
    <part name="Customer" type="xsd:Customer"/>
</message>
```

The "Customer" part element of the message object conforms to the following schema:

```
<complexType name="Customer">
    <all>
        <element name="name" type="string"/>
        <element name="address" type="string"/>
    </all>
</complexType>
```

In this case, a modified message object 78' (not illustrated) will only have one FormatHandler. This FormatHandler will be capable of converting the data of the "Customer" part element into and from corresponding XML document parsing events. Moreover, a modified version of JXTS Transformer 72 (referred to as JXTS transformer 72') is employed in place of JXTS Transformer 72 of FIG. 8. JXTS Transformer 72' is created from the following XSLT stylesheet which is provided in the transformer binding of an alternative version of WSDL document 44 (FIG. 1):

```
<xsl:transform>
    <xsl:template match="/">
        <CustomerMessage>
            <Customer>
                <name>
                    <xsl:value-of select="concat
                        (/Person/firstName,
                        " ", /Person/lastName)"/>
                </name>
```

```
            <address>
                    <xsl:value-of select="concat
                            (/Person/streetNum,
                        " ", /Person/streetName)"/>
                    </address>
        </Customer>
            </CustomerMessage>
    </xsl:template>
    </xsl:transform>
```

Operation for mapping from person object 75 to customer object 79 in this embodiment is much the same as the operation described above for this mapping. One difference is that the single FormatHandler associated with the message object 78' will be responsible for converting the single part of that message object into XML document parsing events (rather than multiple FormatHandlers being used, as described previously).

Thus, this alternative embodiment illustrates an alternative approach to mapping between the same native data type instances 75 and 79 (FIG. 5).

As will be appreciated by those skilled in the art, modifications to the above-described embodiment can be made without departing from the essence of the invention. For example, although the XML programming language and platform independent representation of the present embodiment is implemented according to the SAX XML event-based API, other XML representations may be used. These representations need not necessarily be implemented according to event-based XML APIs. They may for example be implemented according to tree-based XML APIs, such as the World Wide Web Consortium's (W3C) Document Object Model (DOM) XML API.

Further, although the present embodiment employs XML as its programming language and platform independent representation, other such representations, such as Standard Generalized Markup Language, may be employed.

As well, although the programming language and platform independent representations of the first and second native data type instances in the above embodiments both conform to the same schema (i.e. the WSDL schema of Appendix A), it will be appreciated that the programming language and platform independent representations of the first and second native data type instances may conform to different schemas in alternative embodiments. Conformity to different schemas may for example be implemented through use of a different XSLT stylesheet to create the JXTS transformers 72 or 200.

Further, although the described embodiment illustrates a mapping between native data type instances that are substantially equivalent from a semantic standpoint, it is understood that semantic equivalence of the source native data type instance and output native data type instance is not required.

Also, in the case of transformation Web service implementations, it will be appreciated that constructs other than a transformer binding may be used to describe transformations. These constructs may or may not include XSLT stylesheets.

It is understood that "conversion" or "converting" between a programming language and platform independent representation and a native data type instance as described herein does not necessarily imply or require the "source" form to be lost or destroyed when the "target" form is created. For example, when converting a native data type instance to a programming language and platform independent representation, it is not necessarily implied or required for the native data type instance to be lost or destroyed, although it could be lost or destroyed.

Finally, it is not necessary to adhere to the WSIF framework when an embodiment calls for the concrete implementation of a Web service. Other Web service implementations may be employed.

Other modifications will be apparent to those skilled in the art and, therefore, the invention is defined in the claims.

CA920020026US1

APPENDIX A – WSDL Schema

```
1   <schema xmlns="http://www.w3.org/2000/10/XMLSchema"
2           xmlns:wsdl="http://schemas.xmlsoap.org/wsdl/"
3           targetNamespace="http://schemas.xmlsoap.org/wsdl/"
4           elementFormDefault="qualified">
5     <element name="documentation">
6        <complexType mixed="true">
7           <choice minOccurs="0" maxOccurs="unbounded">
8              <any minOccurs="0" maxOccurs="unbounded"/>
9           </choice>
10          <anyAttribute/>
11       </complexType>
12    </element>
13    <complexType name="documented" abstract="true">
14       <sequence>
15          <element ref="wsdl:documentation" minOccurs="0"/>
16       </sequence>
17    </complexType>
18    <complexType name="openAtts" abstract="true">
19       <annotation>
20          <documentation>
21          This type is extended by  component types
22          to allow attributes from other namespaces to be added.
23          </documentation>
24       </annotation>
25       <sequence>
26          <element ref="wsdl:documentation" minOccurs="0"/>
27       </sequence>
28       <anyAttribute namespace="##other"/>
29    </complexType>
30    <element name="definitions" type="wsdl:definitionsType">
31       <key name="message">
32          <selector xpath="message"/>
33          <field xpath="@name"/>
34       </key>
35       <key name="portType">
36          <selector xpath="portType"/>
37          <field xpath="@name"/>
38       </key>
39       <key name="binding">
40          <selector xpath="binding"/>
41          <field xpath="@name"/>
42       </key>
43       <key name="service">
44          <selector xpath="service"/>
45          <field xpath="@name"/>
46       </key>
47       <key name="import">
48            <selector xpath="import"/>
49            <field xpath="@namespace"/>
50       </key>
51       <key name="port">
```

-30-

```xml
52              <selector xpath="service/port"/>
53              <field xpath="@name"/>
54          </key>
55      </element>
56      <complexType name="definitionsType">
57          <complexContent>
58              <extension base="wsdl:documented">
59                  <sequence>
60                      <element          ref="wsdl:import"          minOccurs="0"
61  maxOccurs="unbounded"/>
62                      <element ref="wsdl:types" minOccurs="0"/>
63                      <element          ref="wsdl:message"         minOccurs="0"
64  maxOccurs="unbounded"/>
65                      <element          ref="wsdl:portType"        minOccurs="0"
66  maxOccurs="unbounded"/>
67                      <element          ref="wsdl:binding"         minOccurs="0"
68  maxOccurs="unbounded"/>
69                      <element          ref="wsdl:service"         minOccurs="0"
70  maxOccurs="unbounded"/>
71                      <any namespace="##other" minOccurs="0" maxOccurs="unbounded">
72                          <annotation>
73                              <documentation>to      support      extensibility      elements
74  </documentation>
75                          </annotation>
76                      </any>
77                  </sequence>
78                  <attribute          name="targetNamespace"        type="uriReference"
79  use="optional"/>
80                  <attribute name="name" type="NMTOKEN" use="optional"/>
81              </extension>
82          </complexContent>
83      </complexType>
84      <element name="import" type="wsdl:importType"/>
85      <complexType name="importType">
86          <complexContent>
87      <extension base="wsdl:documented">
88      <attribute name="namespace" type="uriReference" use="required"/>
89          <attribute name="location" type="uriReference" use="required"/>
90      </extension>
91  </complexContent>
92  </complexType>
93      <element name="types" type="wsdl:typesType"/>
94      <complexType name="typesType">
95          <complexContent>
96      <extension base="wsdl:documented">
97      <sequence>
98      <any namespace="##other" minOccurs="0" maxOccurs="unbounded"/>
99  </sequence>
100     </extension>
101 </complexContent>
102 </complexType>
103     <element name="message" type="wsdl:messageType">
104         <unique name="part">
105             <selector xpath="part"/>
106             <field xpath="@name"/>
```

```
107        </unique>
108      </element>
109      <complexType name="messageType">
110        <complexContent>
111      <extension base="wsdl:documented">
112      <sequence>
113      <element ref="wsdl:part" minOccurs="0" maxOccurs="unbounded"/>
114      </sequence>
115        <attribute name="name" type="NCName" use="required"/>
116      </extension>
117      </complexContent>
118      </complexType>
119      <element name="part" type="wsdl:partType"/>
120      <complexType name="partType">
121        <complexContent>
122      <extension base="wsdl:openAtts">
123      <attribute name="name" type="NMTOKEN" use="optional"/>
124        <attribute name="type" type="QName" use="optional"/>
125        <attribute name="element" type="QName" use="optional"/>
126      </extension>
127      </complexContent>
128      </complexType>
129      <element name="portType" type="wsdl:portTypeType"/>
130      <complexType name="portTypeType">
131        <complexContent>
132      <extension base="wsdl:documented">
133      <sequence>
134      <element ref="wsdl:operation" minOccurs="0" maxOccurs="unbounded"/>
135      </sequence>
136        <attribute name="name" type="NCName" use="required"/>
137      </extension>
138      </complexContent>
139      </complexType>
140      <element name="operation" type="wsdl:operationType"/>
141      <complexType name="operationType">
142        <complexContent>
143      <extension base="wsdl:documented">
144        <choice>
145          <group ref="wsdl:one-way-operation"/>
146          <group ref="wsdl:request-response-operation"/>
147          <group ref="wsdl:solicit-response-operation"/>
148          <group ref="wsdl:notification-operation"/>
149        </choice>
150        <attribute name="name" type="NCName" use="required"/>
151      </extension>
152      </complexContent>
153      </complexType>
154      <group name="one-way-operation">
155        <sequence>
156          <element ref="wsdl:input"/>
157        </sequence>
158      </group>
159      <group name="request-response-operation">
160        <sequence>
161          <element ref="wsdl:input"/>
```

```
162          <element ref="wsdl:output"/>
163          <element ref="wsdl:fault" minOccurs="0" maxOccurs="unbounded"/>
164       </sequence>
165    </group>
166    <group name="solicit-response-operation">
167       <sequence>
168          <element ref="wsdl:output"/>
169          <element ref="wsdl:input"/>
170          <element ref="wsdl:fault" minOccurs="0" maxOccurs="unbounded"/>
171       </sequence>
172    </group>
173    <group name="notification-operation">
174       <sequence>
175          <element ref="wsdl:output"/>
176       </sequence>
177    </group>
178    <element name="input" type="wsdl:paramType"/>
179    <element name="output" type="wsdl:paramType"/>
180    <element name="fault" type="wsdl:faultType"/>
181    <complexType name="paramType">
182       <complexContent>
183    <extension base="wsdl:documented">
184    <attribute name="name" type="NMTOKEN" use="optional"/>
185       <attribute name="message" type="QName" use="required"/>
186    </extension>
187    </complexContent>
188    </complexType>
189    <complexType name="faultType">
190       <complexContent>
191    <extension base="wsdl:documented">
192    <attribute name="name" type="NMTOKEN" use="required"/>
193       <attribute name="message" type="QName" use="required"/>
194    </extension>
195    </complexContent>
196    </complexType>
197    <complexType name="startWithExtensionsType" abstract="true">
198       <complexContent>
199    <extension base="wsdl:documented">
200    <sequence>
201    <any namespace="##other" minOccurs="0" maxOccurs="unbounded"/>
202    </sequence>
203    </extension>
204    </complexContent>
205    </complexType>
206    <element name="binding" type="wsdl:bindingType"/>
207    <complexType name="bindingType">
208       <complexContent>
209    <extension base="wsdl:startWithExtensionsType">
210    <sequence>
211    <element name="operation" type="wsdl:binding_operationType" minOccurs="0"
212 maxOccurs="unbounded"/>
213    </sequence>
214       <attribute name="name" type="NCName" use="required"/>
215       <attribute name="type" type="QName" use="required"/>
216    </extension>
```

CA920020026US1

```
217        </complexContent>
218       </complexType>
219       <complexType name="binding_operationType">
220         <complexContent>
221       <extension base="wsdl:startWithExtensionsType">
222       <sequence>
223       <element name="input" type="wsdl:startWithExtensionsType" minOccurs="0"/>
224          <element         name="output"         type="wsdl:startWithExtensionsType"
225   minOccurs="0"/>
226          <element name="fault" minOccurs="0" maxOccurs="unbounded">
227             <complexType>
228               <complexContent>
229       <extension base="wsdl:startWithExtensionsType">
230       <attribute name="name" type="NMTOKEN" use="required"/>
231          </extension>
232       </complexContent>
233       </complexType>
234          </element>
235       </sequence>
236          <attribute name="name" type="NCName" use="required"/>
237       </extension>
238       </complexContent>
239       </complexType>
240       <element name="service" type="wsdl:serviceType"/>
241       <complexType name="serviceType">
242          <complexContent>
243       <extension base="wsdl:documented">
244       <sequence>
245       <element ref="wsdl:port" minOccurs="0" maxOccurs="unbounded"/>
246          <any namespace="##other" minOccurs="0"/>
247       </sequence>
248          <attribute name="name" type="NCName" use="required"/>
249        </extension>
250       </complexContent>
251       </complexType>
252       <element name="port" type="wsdl:portType"/>
253       <complexType name="portType">
254          <complexContent>
255       <extension base="wsdl:documented">
256       <sequence>
257       <any namespace="##other" minOccurs="0"/>
258       </sequence>
259          <attribute name="name" type="NCName" use="required"/>
260          <attribute name="binding" type="QName" use="required"/>
261       </extension>
262       </complexContent>
263       </complexType>
264       <attribute name="arrayType" type="string"/>
265   </schema>
```

What is claimed is:

1. A computer-implemented method of mapping a first native data type instance to a second native data type instance, comprising:
   converting the first native data type instance into a first programming language and platform independent representation conforming to a first schema capable of defining base and derived data types;
   transforming said first programming language and platform independent representation into a second programming language and platform independent representation conforming to a second schema capable of defining base and derived data types; and
   further converting said second programming language and platform independent representation into said second native data type instance.

2. The method of claim 1 wherein said first and second programming language and platform independent representations are eXtensible Markup Language (XML) representations and said first and second schemas are XML schemas.

3. The method of claim 2 wherein said XML representations are event based XML representations.

4. The method of claim 3 wherein said event based XML representations are implemented according to the Simple API for XML (SAX) Application Programming Interface (API).

5. The method of claim 2 wherein said transforming is governed by an XML Stylesheet Transformation Language (XSLT) stylesheet.

6. The method of claim 5 wherein said transforming employs SUN™ javax.xml.transform and javax.xml.transform.sax classes.

7. The method of claim 2 wherein said XML schemas are the Web Services Description Language (WSDL) schema.

8. The method of claim 7 wherein said converting, transforming, and further converting implements a Web service operation.

9. The method of claim 1 further comprising:
   transforming said first or second programming language and platform independent representation into a third programming language and platform independent representation conforming to a third schema capable of defining base and derived data types; and
   converting said third programming language and platform independent representation into a third native data type instance.

* * * * *

UNITED STATES PATENT AND TRADEMARK OFFICE
CERTIFICATE OF CORRECTION

PATENT NO. : 7,058,645 B2  Page 1 of 1
APPLICATION NO. : 10/378377
DATED : June 6, 2006
INVENTOR(S) : Norman K. W. Seto et al.

It is certified that error appears in the above-identified patent and that said Letters Patent is hereby corrected as shown below:

Title page, Item (57) ABSTRACT:
  Line 14: Delete "extensible" and replace with --eXtensible--.
  Line 17: Delete "extensible" and replace with --eXtensible--.

Signed and Sealed this

Second Day of October, 2007

JON W. DUDAS
*Director of the United States Patent and Trademark Office*